(12) United States Patent
Agarwal

(10) Patent No.: US 7,251,387 B2
(45) Date of Patent: Jul. 31, 2007

(54) OPTICAL INTEGRATED CIRCUIT AND METHOD FOR FABRICATING THE SAME

(75) Inventor: Vishnu K. Agarwal, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/894,268

(22) Filed: Jul. 19, 2004

(65) Prior Publication Data
US 2006/0013524 A1     Jan. 19, 2006

(51) Int. Cl.
G02B 6/12     (2006.01)
(52) U.S. Cl. ......................................... 385/14
(58) Field of Classification Search ............... None
See application file for complete search history.

(56) References Cited

U.S. PATENT DOCUMENTS

| | | | |
|---|---|---|---|
| 5,600,483 A | 2/1997 | Fan et al. | 359/344 |
| 5,682,401 A | 10/1997 | Joannopoulos et al. | 372/96 |
| 5,915,051 A | 6/1999 | Damask et al. | 385/16 |
| 5,955,749 A | 9/1999 | Joannopoulos et al. | 257/98 |
| 5,990,850 A | 11/1999 | Brown et al. | 343/912 |
| 6,101,300 A | 8/2000 | Fan et al. | 385/27 |
| 6,130,969 A | 10/2000 | Villeneuve et al. | 385/27 |
| 6,134,043 A | 10/2000 | Johnson et al. | 359/237 |
| 6,198,860 B1 | 3/2001 | Johnson et al. | 385/28 |
| 6,262,629 B1* | 7/2001 | Stengel et al. | 330/124 R |
| 6,462,327 B1* | 10/2002 | Ezell et al. | 250/214 A |
| 6,612,901 B1 | 9/2003 | Agarwal | 451/6 |
| 6,704,515 B1* | 3/2004 | Chan et al. | 398/116 |
| 6,746,824 B2 | 6/2004 | Stanton et al. | 430/312 |
| 2001/0046363 A1* | 11/2001 | Purchase et al. | 385/140 |
| 2003/0133641 A1* | 7/2003 | Yoo | 385/14 |
| 2004/0033004 A1* | 2/2004 | Welch et al. | 385/14 |

* cited by examiner

Primary Examiner—Michelle Connelly-Cushwa
Assistant Examiner—Chris Chu
(74) Attorney, Agent, or Firm—Fletcher Yoder PC

(57) ABSTRACT

The present technique relates to a method and apparatus for fabricating an optical integrated circuit amplifier with another type of optical integrated circuit. In optical networks, optical components exchange optical signals to communicate between different systems coupled to the optical components. The optical components may include optical integrated circuit amplifiers and other optical integrated circuits coupled together through optical paths. The optical integrated circuit amplifiers and other optical integrated circuits of the optical components are fabricated on the same substrate to reduce the cost of fabrication, maintenance and installation, while enhancing the performance of the optical component.

7 Claims, 4 Drawing Sheets

OPTICAL INTEGRATED CIRCUIT AND METHOD FOR FABRICATING THE SAME

BACKGROUND OF THE INVENTION

1. Field of the Invention

The present invention relates generally to optical integrated circuits and, more particularly, to fabricating an optical integrated circuit amplifier with another optical integrated circuit.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Processor-based systems are used in a wide variety of applications to support the communication of data. Such applications include personal computers, telephones, control systems, networks, and a host of consumer products. These systems are typically generic devices that include a processor to perform specific functions based on a software program. This program is stored in a memory device, such as dynamic random access memories (DRAMs), static random access memories (SRAMs) or other suitable types of memories that are within the system and accessible to the processor. Not only does the processor access memory devices to retrieve program instructions, but it also stores and retrieves data created during the execution of the program in one or more memory devices.

Because it may be desirable for information to be transferred from one system to another system, networks may be utilized to facilitate the exchange of data. The networks may be configured to enable data to be shared across an office, a building, or any geographic boundary. While these networks may utilize copper or wireless media, the network may also include optical technologies to increase the speed of the exchange of data, broaden the available bandwidth, and extend the distances between systems. In an optical network, optical fibers may carry optical signals having different wavelengths between different optical components, such as optical integrated circuits, which route and switch the signals between the systems.

In fabricating optical integrated circuits, different materials are layered together to form various structures to process the optical signals. For example, optical integrated circuits may be utilized to multiplex signals, demultiplex signals, adjust power (attenuation) of wavelengths on the signals, add and/or drop a desired wavelength or a set of wavelengths, filter a wavelength, switch the path of signals, and amplify signals. Accordingly, the optical integrated circuits enable the systems to exchange data through the management of the signals over fibers in the optical network.

However, to process the signals in the optical component, the signals are transferred from fiber to the optical integrated circuit and then back to fiber once the signals are processed. The strength or power of signals may degraded in the conversion of signals between the fiber and the optical integrated circuit as well as during the processing of the signals in optical integrated circuit. As such, the signals are often amplified to increase the strength of the signals.

Accordingly, optical integrated circuit amplifiers are typically coupled to fiber and are a separate optical integrated circuit. Because the optical integrated circuit amplifiers are separate from other optical integrated circuits, the cost of a system and the space it consumes are greater than if these structures could be found in a single optical component. Further, the multiple connection points between the other optical integrated circuits and the optical integrated circuit amplifiers may degrade the performance of the system by introducing additional loss at each connection point. Accordingly, an optical component that reduces the cost and space consumed, while improving the performance, would be advantageous.

BRIEF DESCRIPTION OF THE DRAWINGS

The foregoing and other advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Using the techniques described herein, optical integrated circuit (OIC) amplifiers may be fabricated along with other devices, which may be other types of OICs, as a single integrated component to enhance the operation of the resulting optical component (OC). Accordingly, different processing methods may be utilized to fabricate OICs and OIC amplifiers, while reducing damage to either device. Further, the present techniques may provide flexibility in processing methods that utilize different materials with varying properties for specific embodiments of the OIC amplifiers and/or the other OICs.

Figure 1:
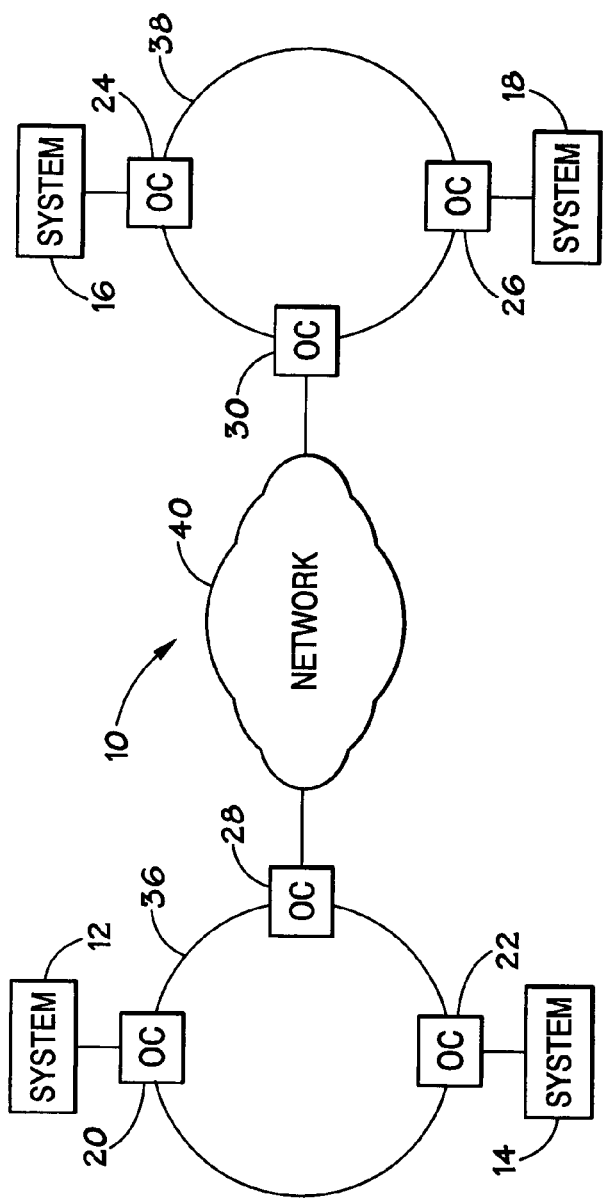
FIG. 1 is a block diagram illustrating an exemplary optical network in accordance with embodiments of the present invention.

Referring initially to FIG. 1, a block diagram of an exemplary optical network architecture is illustrated and designated using a reference numeral 10. The optical network architecture 10 may enable various systems 12–18 to communicate with one another through optical components (OCs) 22–30. In this example, each of the systems 12–18 may communicate across a first optical hub 36, a second optical hub 38, and/or a network 40. The systems 12–18 may be telephony devices, computer systems, optical devices, personal computers (PCs), memory arrays, personal digital assistants (PDAs), or other processor based devices.

The systems 12–18 may utilize OCs 20–30 to communicate with each other. For instance, the system 12 may utilize the OC 20, the system 14 may utilize the OC 22, the system 16 may utilize the OC 24, and the system 18 may utilize the OC 26. Accordingly, the OCs 20–26 may act as an interface for the respective systems 12–18 to provide certain signals to the systems 12–18 and transmit signals from the systems 12–18. Similarly, the OCs 28 and 30 may function as switches that map signals between the optical hubs 36 and 38 and network 40, as discussed below. Further, each of the OCs 20–30 may include optical integrated circuits (OICs) to process the signals.

The OCs 20–30 may utilize the optical hubs 36 and 38 to gain access to each other. The first optical hub 36 may provide access to the system 12 through the OC 20 and the system 14 through the OC 22, while the second optical hub 38 may provide access to the system 16 through the OC 24 and the system 18 through the OC 26. The optical hubs 36 and 38 may include optical media, such as optical fibers, that carry signals from the systems 12–18 along with signals received at the OCs 28 and 30. The optical hubs 36 and 38 may be configured in a fiber ring with each of the OCs 20–30 on the optical hubs 36 and 38 being coupled to fiber. Each of the optical hubs 36 and 38 may be connected to as many as "n" different systems based on the capacity of the OCs 28 and 30. Further, it should be noted that the optical hubs 36 and 38 may be configured as a group of point-to-point fibers to individual OCs 20–30, or a combination of the point-to-point and ring configurations.

Further, the OCs 28 and 30 may provide access to other OCs 20–26 and the optical hubs 36 and 38 via a network 40. The network 40 may include a combination of hubs, switches, routers, or the like. The network 40 may include a local area network (LAN), a wide area network (WAN), a metropolitan area network (MAN), a server area network (SAN), and/or a combination of these types of networks. It should be appreciated that the network 40 may assume other forms, such as a telecommunications network, or may even provide network connectivity through the Internet, or a private network. Accordingly, the network 40 may provide access between the systems 12–18, which may be dispersed geographically with respect to each other.

To communicate between the systems 12–18, optical signals may be processed by the OCs 20–30 to manage the communication between the systems 12–18. The signals may include various channels, wherein a specific wavelength or range of wavelengths is assigned to each of the channels. Each of the channels utilized by the systems 12–18 may be a subset of the wavelengths within certain wavelength bands. For instance, the channels may include wavelengths in the S-band, which spans from about 1450 nanometer (nm) to 1520 nm, the C-band, which spans from about the 1530 nm to 1560 nm, and/or the L-band, which spans from about 1570 nm to 1620 nm. Accordingly, the OCs 20–30 may be configured to manage the signals for the systems 12–18 based upon certain wavelengths associated with the assigned channels for each of the respective systems 12–18.

The signals transferred over the fibers in the optical hubs 36 and 38 and network 40 may be processed by the OCs 20–30 based on the wavelengths assigned to the systems 12–18. As noted above, each of the OCs 20–30 may include one or more OICs. The OICs may perform specific operations on the signals or wavelengths within the signals for the OCs 20–30. For instance, the OICs may process signals by multiplexing channels, demultiplexing channels, adjusting power (attenuation) of channels, adding and/or dropping a channel or group of channels, filtering specific channels or group of channels, switching channels to another fiber, and amplifying specific channels or signals. As a specific example, the system 12 may be assigned a channel in the L-band, which includes the wavelengths from about 1570 nm to 1580 nm. The OC 20 may remove signals within this assigned channel from the fiber in the first optical hub 36 and provide those signals to the system 12. Further, if the system 14 is assigned another channel in the L-band, which includes the wavelengths from about 1580 nm to 1590 nm, then the OC 28 may provide signals within the wavelength range of 1570 nm to 1590 nm from the network 40 to the first optical hub 36. Accordingly, the OCs 20–30 may be configured to manage or process signals for the systems 12–18 based upon the wavelengths.

For the OCs 20–30 to manage the wavelengths in the optical hubs 36 and 38 and network 40, the signals are transferred between the OCs 20–30 and the fibers in the optical hubs 36 and 38 and network 40 for processing of the signals. The conversion of these signals is a lossy process that reduces the power or strength of the signals being converted. Accordingly, the signals may be amplified to increase the signal strength before processing in the OICs and/or after processing in the OICs. As such, it may be advantageous to have an OIC amplifier associated with each OCs 20–30 or each of the OICs in the OCs 20–30.

The OIC amplifiers and the other OICs having other functions are typically separate devices that are coupled together with fiber or other suitable material. Because these devices are separate, the OIC amplifiers and the other OICs may have higher loss than an integrated device, and the cost of the separate devices may be higher than the fabrication of an integrated device. For instance, if the connections between the OIC amplifiers and the other OICs are via fibers, then each connection may introduce a higher loss than a continuous waveguide in a substrate. Further, the cost of fabricating the OIC amplifiers and the other OICs as a single device may reduce the cost in comparison to separate devices because materials and processes may be shared in an integrated device. Also, the combination of the other OIC and the OIC amplifier on same chip has the potential to reduce the installation costs associated with the installing the fibers, as well as maintenance costs for repairing breaks in exposed fibers. In addition, the space consumed by the other OICs and the OIC amplifiers is greater with separate devices than the space consumed by an integrated component that has other OICs and OIC amplifiers stacked together. The integration of the other OICs and OIC amplifiers in OCs 20–30 is further discussed in FIG. 2.

Figure 2:
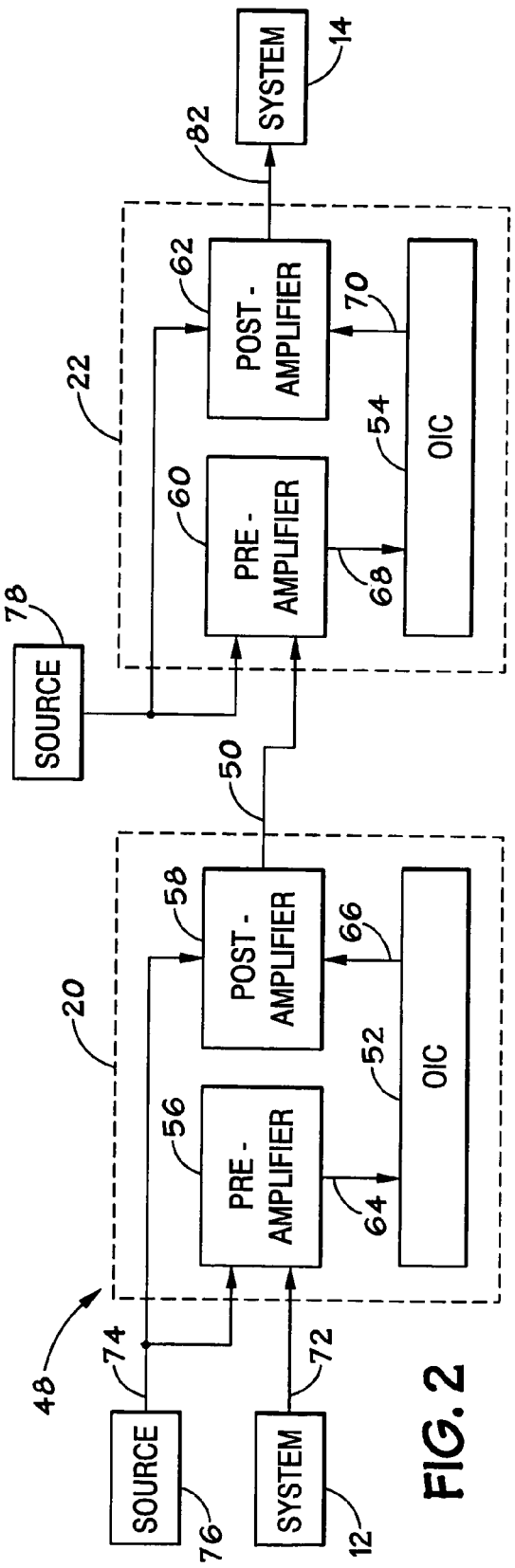
FIG. 2 is a block diagram of two exemplary optical components of FIG. 1 in accordance with embodiments of the present invention.

FIG. 2 is a block diagram of two exemplary optical components of FIG. 1 in accordance with embodiments of the present invention. In this diagram, which is generally referenced by the reference numeral 48, two OCs 20 and 22 may communicate via a fiber 50, which may be one of the fibers in the optical hub 36 (FIG. 1). The OCs 20 and 22 may provide a communication path from the system 12 to the system 14. It should be noted that this diagram is merely used for exemplary purposes and any of the OCs 20–30 (FIG. 1) may be utilized in a similar manner.

The OC 20 may include a substrate divided into an OIC pre-amplifier 56, an OIC post-amplifier 58, and another type of OIC 52, such as an OIC for multiplexing, demultiplexing, adjusting the power, adding, dropping, filtering, and switching specific channels or signals, for example. The OIC pre-amplifier 56 and/or the OIC post-amplifier 58 may be erbium (Er) doped waveguide amplifiers that include Er doped materials or ytterbium (Yb) doped waveguide amplifiers that include Yb doped materials. Further, as discussed above, the other OIC 52 may process signals by multiplexing, demultiplexing, adjusting the power, adding, dropping, filtering, and switching specific channels or signals. The OIC pre-amplifier 56 and the OIC post-amplifier 58 may exchange signals with the other OIC 52 via optical paths 64 and 66. The optical paths 64 and 66 may be structures or vias within the substrate, which are utilized to couple the OIC pre-amplifier 56 and/or the OIC post-amplifier 58 with the other OIC 52. Accordingly, the optical paths 64 and 66 may be waveguides that guide signals between the OIC amplifiers 56 and 58 and the other OIC 52.

Similar to the OC 20, the OC 22 may include a substrate divided into an OIC pre-amplifier 60, an OIC post-amplifier 62, and another type of OIC 54. The OIC amplifiers 60 and 62 may be Er doped waveguide amplifiers or Yb doped waveguide amplifiers, for example. Also, the OIC 54 may process the signals in a manner similar to OIC 52, which is discussed above. The OIC pre-amplifier 60 and the OIC post-amplifier 62 may exchange signals with the other OIC 54 through optical paths 68 and 70, which are similar to the optical paths 64 and 66. Accordingly, the optical paths 68 and 70 may be waveguides that guide signals between the OIC amplifiers 60 and 62 and the other OIC 54.

By utilizing the OCs 20 and 22, signals may be generated from the system 12 in a transmission phase and delivered to the system 14 in a reception phase. In the transmission phase, the OIC pre-amplifier 56 may receive a data signal from the system 12 via a fiber 72 and receive a pump signal from a source 76 via a fiber 74. The source 76 may be laser or group of lasers that provide the pump signal within a selected wavelength or range of wavelengths to amplify the data signal received from the system 12. For instance, the source 76 may provide a 980 nm or 1480 nm signal, as the pump signal. The OIC pre-amplifier 56 may boost the data signal with the pump signal and provide the amplified data signal to the other OIC 52 for processing via the optical path 64. Then, the processed signal may be provided to the OIC post-amplifier 58 via the optical path 66 for further amplification with the pump signal that is received from the source 76 via the fiber 74. The OIC post-amplifier 58 may boost the data signal, which has been amplified and processed, for transmission to the system 14 via the fiber 50.

During the reception phase, the OIC pre-amplifier 60 may receive the data signal from the fiber 50 and receive a pump signal from a source 78 via a fiber 80. Similar to the source 76, the source 78 may be laser that provides the pump signal within a selected wavelength or group of wavelengths to amplify the wavelengths assigned to the system 14. The OIC pre-amplifier 60 may boost the data signal with the pump signal and provide the amplified data signal to the other OIC 54 for processing via the optical path 68. Then, the processed signal may be provided to the OIC post-amplifier 62 via the optical path 70 for further amplification. The OIC post-amplifier 62 may also be coupled to the source 78 through the fiber 80. Accordingly, the OIC post-amplifier 62 may boost the signal and provide the amplified processed signal to the system 14.

Advantageously, the OCs 20 and 22 may provide various costs savings, while enhancing the operation of the OCs 20 and 22 by boosting the signal strength. First, the fabrication costs along with the space consumed by the individual devices may be reduced because the OIC amplifiers 56–62 and the other OICs 52 and 54 are fabricated on the same substrate for the respective OCs 20 and 22. As a result, the OIC amplifiers 56–62 and other OICs 52 and 54 may share processes to reduce fabrication costs. Secondly, the costs of installation and maintenance labor for the OCs 20 and 22 may be reduced because each of the other OICs 52 and 54 and associated OIC amplifiers 56–62 are integrated into a single device, which reduces the fiber connections between the other OICs 52 and 54 and respective OIC amplifiers 56–62. As such, the labor for maintenance and installation of these additional fiber connections is eliminated for the OCs 20 and 22. Thus, the OCs 20 and 22 may provide amplified signals with less loss and increased signal strength, while reducing the cost of fabrication, installation and maintenance.

While the integration of the OIC amplifiers 56–62 along with the other OICs 52 and 54 may be formed on the same level of the substrate, the fabrication of the OIC amplifiers 56–62 with the other OICs 52 and 54 may involve a layered fabrication process to provide flexibility in the fabrication of the other OICs 52 and 54 and the OIC amplifiers 56–62. For example, the OIC 52 may have a core material that includes certain properties for its optimum performance. These properties may balance various parameters, such as bend radius, index of refraction, birefringence, wavelength filtering, reflective loss, and/or attenuation to provide specific optical performance for the OIC 52. Similarly, the OIC amplifiers 56 and 58 may have a core material that is doped with Er and/or Yb, and may be designed with different optical properties specific to the optimal performance of the OIC amplifiers 56 and 58. These different core materials may cause variations in the optical properties, which may result in performance degradation of the other OIC 52 along with the OIC amplifiers 56 and 58. Further, the thickness of the core material in the OIC amplifiers 56 and 58 may be different from the core material thickness in the other OIC 52. As a result, fabricating the OIC amplifiers 56 and 58 on a different level than the other OIC 52 may provide flexibility in the selection of materials and processes, which may maintain the optical properties of the other OIC 52 and the OIC amplifiers 56 and 58. The OC 20 with the OIC amplifiers 56 and 58 and the other OIC 52 on different levels of a substrate may be further described below in FIG. 3.

Figure 3:
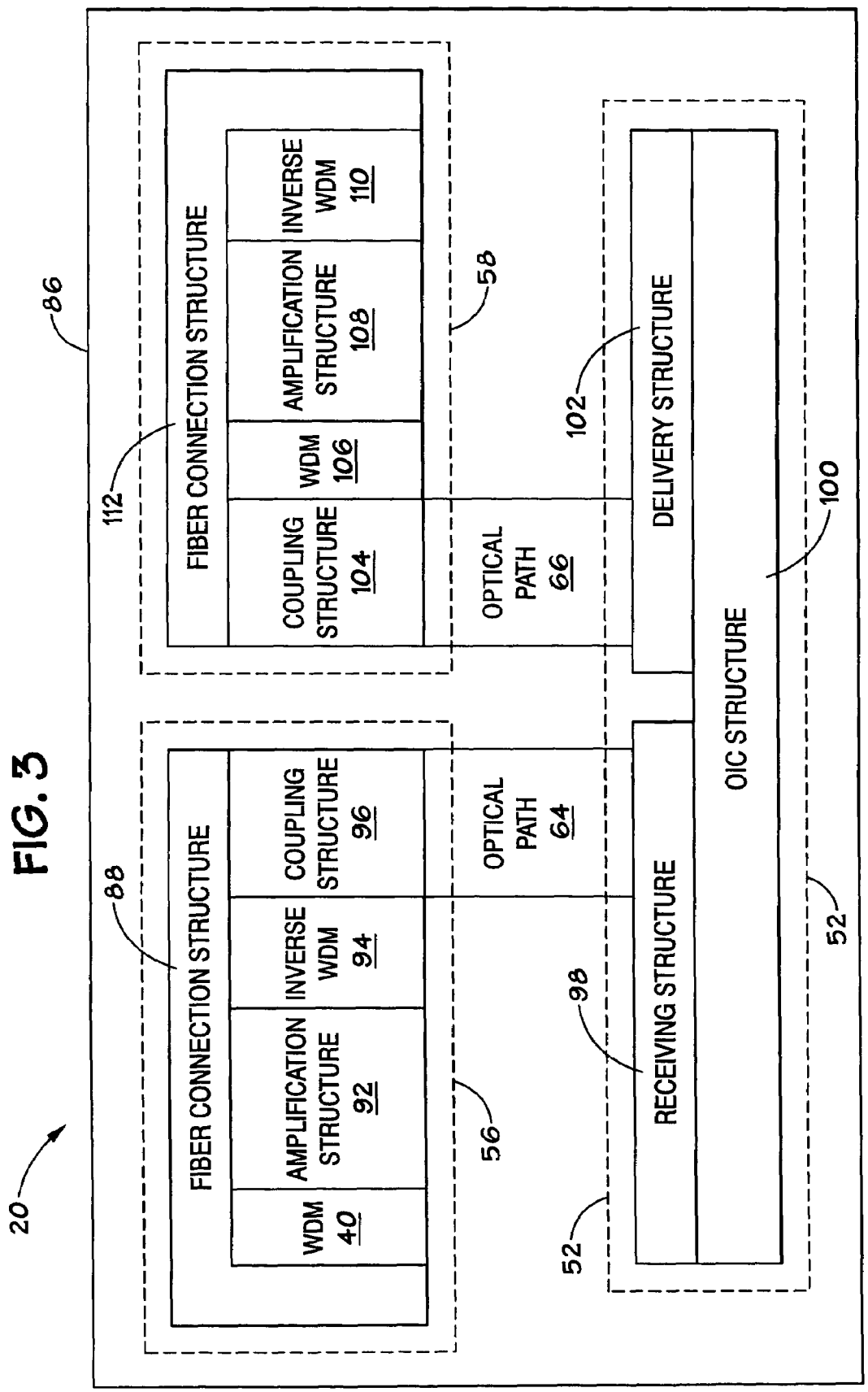
FIG. 3 is an exemplary embodiment of the optical component of FIG. 2 in accordance with embodiments of the present invention.

FIG. 3 is an exemplary embodiment of the optical component of FIG. 2 in accordance with embodiments of the present invention. In this diagram, which is an exemplary embodiment of OC 20, the other OIC 52 may be fabricated on different layers of a substrate 86 from the OIC pre-amplifier 56 and OIC post-amplifier 58. The substrate 86 may include different portions or structures, which are utilized to receive the fibers 50, 72 and 74 (FIG. 2), couple the OIC amplifiers 56 and 58 to the other OIC 52, and process the data and pump signals. Beneficially, the substrate 86 may fabricated to enable the selection of materials that have specific properties for the different structures 88–112, which form the OIC amplifiers 56 and 58 and the other OIC 52.

The OIC pre-amplifier 56 may include a first fiber connection structure 88, a first waveguide division multiplexer (WDM) 90, a first amplification structure 92, a first inverse WDM 94, and/or a first coupling structure 96. The first fiber connection structure 88 may be utilized to receive the fiber 72 from the system 12 and the fiber 74 from the source 76 (FIG. 2). For instance, the first fiber connection structure 88 may utilize mechanical alignment, optical mode transformers, grating structures, or other suitable structures to couple the fibers to the substrate 86. The first WDM 90 may combine the signals from the fibers to provide the first amplification structure 92 with a single signal that includes the data and pump signals. In the first amplification structure 92, the pump signal excites a doped material, which is discussed below, to amplify the data signal passing through the amplifier structure. The first inverse WDM 94 may receive the combined signal and split the amplified data signal from the pump signal to provide the amplified data signal to the first coupling structure 96. The first coupling structure 96 may be a waveguide that adjusts the path of the amplified data signal and the pump signal to maintain the optical properties of the signals. The first coupling structure 96 may be designed based upon various geometrical structures that are utilized to maintain a bend radius to prevent excessive attenuation. While the amplified data signal may be provided to the optical path 64, the pump signal in the first coupling structure 96 may be redirected to the first amplification structure 92 through the first inverse WDM 94 to further strengthen the signals or may be provided to another structure within the substrate 86. Thus, from the first coupling structure 96, the amplified data signal may be provided to the optical path 64 connected between the OIC pre-amplifier 56 and the other OIC 52.

The OIC 52 may include a receiving structure 98, an OIC structure 100, and a delivery structure 102. The receiving structure 98 may receive the amplified data signal from the optical path 64. Similar to the coupling structure 96, the receiving structure 98 may be a waveguide that adjusts the path of the amplified data signal to maintain the optical properties without resulting in excessive attenuation. The OIC structure 100 receives the amplified data signal from the receiving structure 98 and processes the amplified data signal. The OIC structure 100 may include various structures that process the signals by multiplexing wavelengths, demultiplexing wavelengths, adjusting power (attenuation) of signals, adding and dropping a wavelength or group of wavelengths, filtering specific wavelengths or group of wavelengths, switching signals to another fiber, and/or amplifying specific wavelengths or signals, as discussed above. Then, the delivery structure 102, which may be similar to the receiving structure 98, may provide the processed signal to the OIC post-amplifier 58 via the optical path 66.

The OIC post-amplifier 58 may include a second coupling structure 104, a second WDM 106, a second amplification structure 108, a second inverse WDM 110, and/or a second fiber connection structure 112. Each of these structures may be similar to the structures discussed above with regard to the OIC pre-amplifier 56. The second coupling structure 104 may receive the processed signals from the optical path 66. The second WDM 90 may combine the processed signal from the other OIC 52 with a pump signal, such as the pump signal from the source 76 (FIG. 2), to provide the second amplification structure 108 with a single signal. The pump signal may be provided via the first fiber connection structure 88 or via a fiber from the source 76 (FIG. 2) coupled to the second fiber connection structure 112. The second inverse WDM 110 may receive the signal and split the processed signal to be provided to the second fiber connection structure 112 from the pump signal. The second fiber connection structure 112 may be a waveguide that adjusts the path of the processed signal and pump signal to reduce excessive attenuation. From the second fiber connection structure 112, the signal may be provided to the fiber 50. Accordingly, the exemplary materials utilized in the structures 88–96 of the OIC pre-amplifier 56 are shown in greater detail in FIG. 4.

Figure 4:
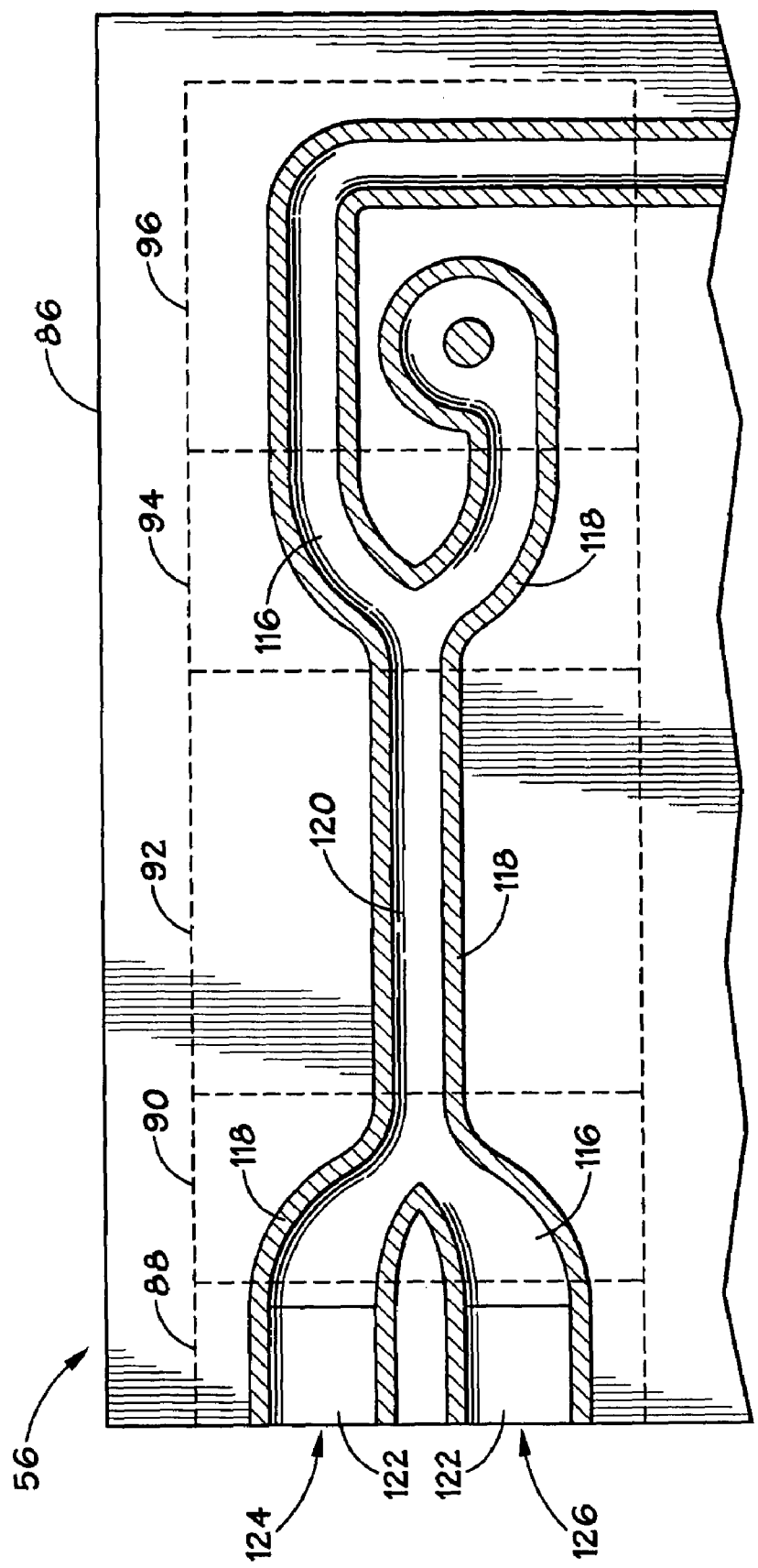
FIG. 4 is an exemplary embodiment of the optical integrated circuit pre-amplifier of FIG. 3 in accordance with embodiments of the present invention.

FIG. 4 is an exemplary embodiment of the pre-amplifier of FIG. 3 in accordance with embodiments of the present invention. In this diagram, exemplary materials utilized within the structures 88–96 of the OIC pre-amplifier 56 are shown. These materials may be fabricated through different processes to form the structures 88–96 that receive the signals, amplify the signals, and provide the signals to the other OIC 52 via the optical path 64 (FIG. 2). Beneficially, by having the OIC preamplifier 56 fabricated on a different level of the substrate 86, the selection of materials for the OIC pre-amplifier 56 may be based on the specific properties for the structures 88–96 of the OIC pre-amplifier 56. It should be noted that the materials utilized for the structures 98–102 of the other OIC 52 and the structures 104–112 of the OIC post-amplifier 58 (FIG. 2) may be fabricated in a similar manner on different levels of the substrate 86 to provide flexibility in the selection of those materials, as well.

Within the OIC pre-amplifier 56, various materials may be utilized to provide specific optical properties. For instance, a core material 116 and a cladding material 118 may be deposited over the substrate 86 and patterned through various processes. The core material 116 may include an optically transparent material, such as silica glass or ceramic materials that have a high refractive index, while the cladding material 118 may include a material with a low refractive index. As a specific example, the core material 116 may be an aluminum oxide $Al_2O_3$ or yttrium oxide $Y_2O_3$, while the cladding is silicon dioxide $SiO_2$ Also, a doped core material 120 may be utilized, which may include the core material 116 doped with Er or Yb ions to improve the amplification of the data signal. Further, an index matching fluid 122 may be deposited in a first groove 124 and a second groove 126 to match the refractive index of the fibers, such as the fibers 72 and 74 (FIG. 2), with the core material 116. This reduces loss and back reflection at the coupling of the fibers and the core material 116. Accordingly, each of these materials 116–122 may be utilized to provide the specific optical properties for the structures 88–96.

Based on the specific materials 116–122, the structures 88–96 may be fabricated in specific configurations. For instance, the first fiber connection structure 88 may include grooves 124 and 126 to align the fibers with the core material 116. The first WDM 90 may be an optical coupler that combines the core material 116 associated with the grooves 124 and 126, while the first inverse WDM 94 may be an optical splitter that separates signals, such as the data signal and the pump signal. The first amplification structure 92 may include a specific length of the doped core material 120 to amplify the signal received from the first WDM 90. The first amplification structure 92 may include geometric shapes, such as folded spiral circuits, continuous spirals loops or arcs, to extend the length of the doped core material within a smaller footprint. The geometric shapes of the first amplification structure 92 may be limited by the geometry and associated bend radius in relation to the wavelengths of the signals. Similarly, the first coupling structure 96 may include different geometric shapes utilized to guide the signals from the OIC pre-amplifier 56 level to the other OIC 52 level of the substrate 86. As an example, the first coupling structure 96 may also include a loop that guides the pump signal back into the amplifier structure 92 via the inverse WDM 94 and an arc that guides the amplified data signal to the optical path 64. The fabrication of the OC 20 (FIG. 3) is discussed below in FIG. 5.

Figure 5:
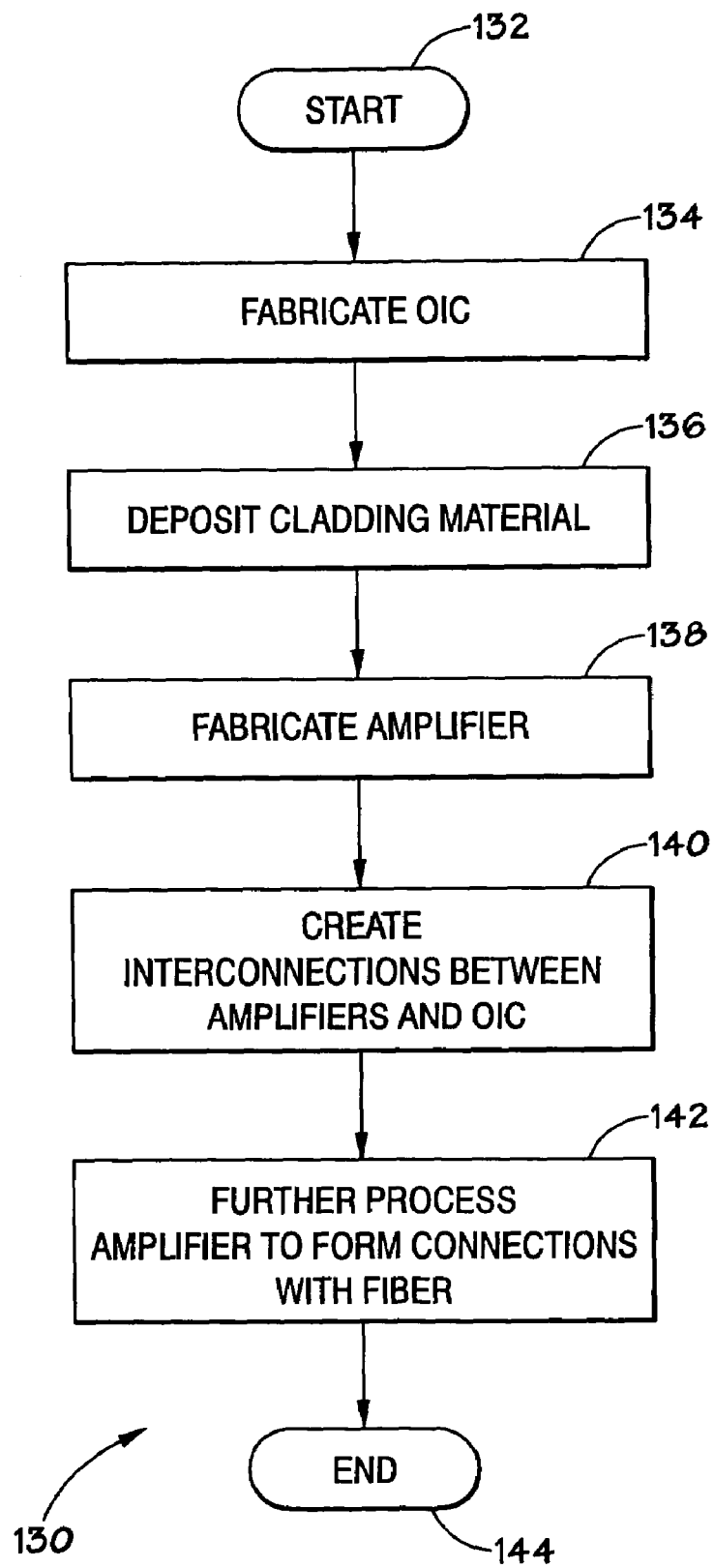
FIG. 5 is a process flow diagram illustrating the exemplary fabrication of the optical component of FIG. 2 in accordance with embodiments of the present invention.

FIG. 5 is a process flow diagram illustrating the exemplary fabrication of the optical component of FIG. 2 in accordance with embodiments of the present invention. The process flow diagram is generally referred to by reference numeral 130. In this diagram 130, the OC, which may be any of the OCs 20–30 (FIG. 1), may be fabricated to integrate one or more OIC amplifiers along with one or more OICs in the OC. As discussed above, the OCs may include OICs, such as the other OICs 52 and 54 (FIG. 2), along with the one or more OIC amplifiers, such as the OIC amplifiers 56–62 (FIG. 2). The OICs and amplifiers may be fabricated on different levels of a substrate for an OC. Beneficially, by utilizing two different levels, the OICs and amplifiers may be designed independently, which enables the selection of material having specific properties for the amplifiers and the OICs.

The process begins at block 132. At block 134, the OIC may be fabricated on the substrate, which may be the substrate 86 (FIG. 3). The fabrication of the OIC may include various process steps, such as depositing materials on the substrate, patterning these materials and annealing the patterned material along with the substrate to form the specific OIC. For example, the fabrication processes may include chemical vapor deposition, physical vapor deposition, dry etching, wet etching, ion implantation, rapid thermal annealing, and/or photolithographic processes to form the structures for the OIC. At block 136, a cladding material may be deposited over the substrate and the OIC structure. As discussed above, the cladding material may include a material low refractive index, such as a silicon oxide ($SiO_2$), a dielectric material, or other suitable material.

Once the cladding material is deposited, the fabrication of the amplifier may begin, as shown in block 138. The amplifier fabrication may include additional fabrication process steps, similar to those discussed above. At block 140, the interconnections, which may be the optical paths 64–70 (FIG. 2), between the amplifier and the OIC may be created through additional fabrication processes that may include etching the cladding material and depositing a glass or ceramic material to provide an optical path between the amplifier and the OIC. Then, at block 142, the amplifier may be further processed to form the connections with optical fibers, which may be the fibers 50, 72, 74, 80 and 82 (FIG. 2). Accordingly, the process ends at block 144.

Alternatively, it should be appreciated that the OCs, such as the OCs 20–30 (FIG. 1), may include different configurations. For example, the OC 20 may be fabricated with the OIC pre-amplifier 56, but the OIC post-amplifier 58 may not be part of the OC 20. In this configuration, the signal may be transferred from the other OIC 52 to the fiber 50. As another example configuration, the OC 20 may include the OIC post-amplifier 58, but the OIC pre-amplifier 56 may not be part of the OC 20. In this configuration, the signal may be transferred from the system 12 to the other OIC 52 via the fiber 72 for processing without amplification. Then, the signal may be amplified by the OIC post-amplifier 58 after being processed by the other OIC 52. Accordingly, as discussed above, each of these alternative configurations may be formed with similar fabrication processes and may provide the advantages discussed above. Thus, it should be appreciated that the OCs, such as the OCs 20–30 (FIG. 1), may include different configurations.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An optical network comprising:
   a plurality of optical components;
   a network coupled to the plurality of optical components;
   at least one of the plurality of optical components comprising:
      a first optical integrated circuit formed on a first level of a substrate;
      a second optical integrated circuit formed on a second level of the substrate, the second level and the first level being on different planes that are vertically spaced with respect to the substrate, the second optical integrated circuit being coupled to the first optical integrated circuit, wherein at least one of the first optical integrated circuit and the second optical integrated circuit is an amplifier; and
      an optical path coupled between the first optical integrated circuit and the second optical integrated circuit.

2. The optical network, as set forth in claim 1, comprising at least one laser coupled to the amplifier to provide a pump signal to the amplifier.

3. The optical network, as set forth in claim 1, wherein each of a group of the plurality of optical components is coupled to one of a plurality of systems.

4. The optical network, as set forth in claim 3, wherein the plurality of systems comprise at least one processor based device and at least one optical device.

5. The optical network, as set forth in claim 1, wherein the network is one of a local area network, a wide area network, a metropolitan area network and a server area network.

6. The optical network, as set forth in claim 1, wherein the amplifier is an optical integrated circuit pre-amplifier.

7. The optical network, as set forth in claim 1, wherein the amplifier is an optical integrated circuit post-amplifier.

* * * * *